UNITED STATES PATENT OFFICE.

HENRY W. MERRITT, OF BOSTON, MASSACHUSETTS, ASSIGNOR TO WILLIAM H. IRELAND, OF SAME PLACE.

PLASTIC COMPOUND.

SPECIFICATION forming part of Letters Patent No. 341,157, dated May 4, 1886.

Application filed January 15, 1886. Serial No. 188,657. (No specimens.)

*To all whom it may concern:*

Be it known that I, HENRY W. MERRITT, of Boston, county of Suffolk, and State of Massachusetts, have invented an Improvement in Plastic Compounds, of which the following description is a specification.

This invention is an improvement upon that which has been secured to me by Letters Patent of the United States No. 322,307, granted July 14, 1885; and its object is to secure a new and more economic mode and means of obtaining a plastic compound which, when exposed to the air, will set and become extremely hard.

In the practice of my former invention I preferably employed as ingredients of the plastic compound to be formed a highly silicious silicate of magnesia called "asbestine," in a pulverized condition, quartz-sand, and caustic soda or caustic potash, with water to dissolve the alkali and give plasticity to the mass when these ingredients were thoroughly incorporated together. To this I sometimes added a small proportion of alkaline silicate to make the plastic mass more adhesive. I have discovered, however, that when such a highly silicious solid silicate as asbestine is combined with a highly basic alkaline silicate in sufficient proportion to bring about extensive chemical reaction between them there results a compound which hardens into a coherent solid body, and which holds and binds any sand or other comminuted mineral incorporated into its mass while in a plastic state. I am thus enabled to dispense with fixed caustic alkali as a primary ingredient of the plastic compound, and to employ the sand chiefly for the purpose of extending the bulk of the mass.

In this new compound I use silicate of soda or silicate of potash in which the alkaline base is so preponderant as to render such silicate soluble in water. I have also found that a double silicate of soda and potash is more powerful in its chemical reaction upon the asbestine and sand than a simple silicate of either soda or potash alone.

In order to make a good plaster for walls, I take fourteen pounds of pulverized asbestine and from seven to ten pounds of alkaline silicate in aqueous solution, having a density of about 41° Baumé and containing about twenty-two per cent. of soda ($Na_2O$) to about seventy-eight per cent. of silicic acid ($SiO_2$,) the formula in this instance being represented substantially by $Na_2O (SiO_2) 4$. These ingredients I mix together with from eighteen to twenty-two pounds of water, and the whole will then fill a pail of ordinary size. With this I incorporate double its bulk or about two pailfuls of sand, which, if dry, would weigh from one hundred and ten to one hundred and fifteen pounds. This mass, when thoroughly intermixed, makes a plaster of proper consistency to apply with a trowel in the usual manner.

The plastic compound so formed gradually hardens on exposure to the air, and finally becomes very stone-like in its character.

The chemical relations of the ingredients of this compound, as far as I have been able to ascertain them, may be stated as follows: Asbestine is a silicate of magnesia in which the proportion of silicic acid to the magnesic base combined therewith is high, while in an alkaline silicate existing in the form of an aqueous solution the proportion of silicic acid to the alkaline base is low, considered with reference to their relative chemical quantivalence, so that when the asbestine—which is predominantly acid in character—and the alkaline silicate—which is predominantly basic in character—are brought together, the one in fine powder and the other in solution, a chemical union takes place between the silicic acid of the solid magnesic silicate and the alkali of the soluble alkaline silicate, and there results a double silicate of magnesia and soda or potash, or a complex silicate of magnesia, soda, and potash, as the case may be, which upon evaporation of the excess of water associated therewith becomes a very hard and coherent body, and acts as a binding material to the sand and other comminuted substances inclosed within its mass.

When quartz-sand is used to extend the bulk of plastic compound, it is probable that some chemical reaction takes place between its silicic acid and the base of the soluble alkaline silicate, so as to produce further chemical union between the constituents of the mass; but such reaction would presumably be confined substantially to the exposed surfaces of the sand, and this result, whatever it may be, is only collateral to the production of the principal binding compound.

Variations may be made within considerably wide limits in the proportions of the ingredients which constitute my new plastic compound herein described; but considerations of economy will prevent much departure from the relative proportions already stated. Thus, if the quantity of asbestine used be in excess of that needed to furnish silicic acid enough to satisfy the affinity of the base of the soluble alkaline silicate, then such excess, if not too great, will, like the chemically-unaffected portions of the sand, be held mechanically within the mass of the binding compound resulting from the chemical reactions which take place between the remainder of the silicate of magnesia and the alkaline silicate; but such excess of asbestine is more economically replaced by sand.

In like manner, if the quantity of alkaline silicate used be in excess of that needed to satisfy the affinity of the silicic acid present in the asbestine and sand, then such excess, if not too great, will harden and be held within the mass of the binding compound formed by the chemical union which does take place between the ingredients.

It will be seen that the highly silicious magnesic silicate and the highly basic alkaline silicate are the essential constituents of the plastic compound, since the resultant stone-like product is due chiefly to their chemical combination, and that the sand introduced along with them is used mainly for the purpose of economy in extending the bulk of plastic material wherein it is held and bound by the solid compound formed by the chemical union of the active ingredients. Consequently the quantity of sand or other equivalent comminuted mineral which may be used to extend the bulk of the plastic compound can be made to vary from nothing up to the practical limit within which its particles will be separately embedded and inclosed in the mass of the binding compound resulting from the chemical union of the magnesic and alkaline silicates.

It is important for the most efficient and economic use of the asbestine that it be finely pulverized; and it is also important, for greater expedition of the chemical reactions, that the solution of alkaline silicate be as much concentrated as is consistent with obtaining thorough incorporation of the ingredients of the plastic compound.

I claim—

1. A plastic compound containing as ingredients a highly silicious silicate of magnesia in a pulverized state and a highly basic alkaline silicate in aqueous solution, each in such proportion as to satisfy substantially the mutual affinity of the predominant silicic acid of the one and the predominant alkaline base of the other, and to form a resultant chemical compound which on exposure to the air will harden and bind into its coherent mass such proportion of sand or other comminuted mineral as may be incorporated therewith, substantially as described.

2. A plastic compound consisting of a highly silicious silicate of magnesia in a pulverized condition, a highly basic silicate of soda and potash in aqueous solution, and comminuted silica, the whole being intermixed and incorporated, substantially as described.

3. A plastic compound containing as ingredients pulverized asbestine, a highly basic alkaline silicate in sufficient proportion to satisfy substantially the affinity of the predominant silicic acid in the asbestine, and a proportion of sand not exceeding in amount what can practically be bound by the coherent mass resulting from the chemical union of the asbestine and alkaline silicate, the whole being intermixed and incorporated, substantially as described.

In testimony whereof I have signed my name to this specification in the presence of two subscribing witnesses.

HENRY W. MERRITT.

Witnesses:
 G. W. GREGORY,
 C. M. CONE.